US007711154B2

(12) United States Patent
Danielson et al.

(10) Patent No.: US 7,711,154 B2
(45) **Date of Patent: *May 4, 2010**

(54) MULTI-TECHNOLOGY INFORMATION CAPTURE SYSTEM AND METHOD

(75) Inventors: Arvin D. Danielson, Solon, IA (US); Pixie Austin, Marysville, WA (US); John H. Sherman, Cedar Rapids, IA (US); John H. Sherman, Jr., Santa Fe, NM (US)

(73) Assignee: Intermec IP Corp., Everett, WA (US)

( * ) Notice: Subject to any disclaimer, the term of this patent is extended or adjusted under 35 U.S.C. 154(b) by 802 days.

This patent is subject to a terminal disclaimer.

(21) Appl. No.: 11/598,984

(22) Filed: Nov. 14, 2006

(65) Prior Publication Data

US 2007/0092107 A1 Apr. 26, 2007

Related U.S. Application Data

(60) Division of application No. 11/385,040, filed on Mar. 20, 2006, which is a continuation of application No. 11/204,751, filed on Aug. 16, 2005, now abandoned, which is a continuation-in-part of application No. 11/057,055, filed on Feb. 11, 2005, now abandoned.

(60) Provisional application No. 60/543,842, filed on Feb. 11, 2004, provisional application No. 60/605,390, filed on Aug. 28, 2004.

(51) Int. Cl.
*G06K 9/00* (2006.01)

(52) U.S. Cl. ....................... 382/115; 382/116; 382/117; 382/124; 348/207.99

(58) Field of Classification Search .................. 382/115
See application file for complete search history.

(56) References Cited

U.S. PATENT DOCUMENTS

| | | | | | |
|---|---|---|---|---|---|
| 4,876,591 | A | * | 10/1989 | Muramatsu | 348/236 |
| 5,482,139 | A | * | 1/1996 | Rivalto | 186/36 |
| 5,619,346 | A | * | 4/1997 | Powers | 358/505 |
| 5,821,523 | A | * | 10/1998 | Bunte et al. | 235/472.01 |
| 5,959,541 | A | * | 9/1999 | DiMaria et al. | 340/5.52 |
| 5,984,366 | A | * | 11/1999 | Priddy | 283/72 |

(Continued)

OTHER PUBLICATIONS

Ibis. Product Description [Online]. Identix Inc., 2002 [archived by WaybackMachine on Dec. 16, 2002] [retrieved on Sep. 10, 2009]. Retrieved from the Internet: <URL:http://web.archive.org/web/20021206042119/www.identix.com/products/pro_mobile_ibis.html>.*

*Primary Examiner*—Matthew C Bella
*Assistant Examiner*—Sath V Perungavoor
(74) *Attorney, Agent, or Firm*—Shook, Hardy & Bacon L.L.P.

(57) ABSTRACT

A mobile system having a portable fingerprint collecting system for generating a digitized image of a fingerprint collected from a subject, a database system configured to store a database containing a plurality of fingerprint templates cross-referenced with identification information, the database system configured to compare the digitized fingerprint images generated by the portable fingerprint collecting device with the fingerprint templates stored in the database to provide identification information for the fingerprint, and a communication system providing real time communication of the digitized fingerprint image and identification information between the portable fingerprint collecting system and the database system.

8 Claims, 6 Drawing Sheets

U.S. PATENT DOCUMENTS

| | | | | |
|---|---|---|---|---|
| 5,995,014 | A * | 11/1999 | DiMaria | 340/5.52 |
| 6,075,455 | A * | 6/2000 | DiMaria et al. | 340/5.82 |
| 6,108,636 | A * | 8/2000 | Yap et al. | 705/5 |
| 6,142,876 | A * | 11/2000 | Cumbers | 463/25 |
| 6,330,975 | B1 * | 12/2001 | Bunte et al. | 235/472.01 |
| 6,999,119 | B1 * | 2/2006 | Shibazaki et al. | 348/273 |
| 7,039,813 | B2 * | 5/2006 | Algazi et al. | 713/186 |
| 2003/0050732 | A1 * | 3/2003 | Rivalto | 700/237 |
| 2003/0084305 | A1 * | 5/2003 | Siegel et al. | 713/186 |
| 2003/0149343 | A1 * | 8/2003 | Siegel et al. | 600/300 |

* cited by examiner

MULTI-TECHNOLOGY INFORMATION CAPTURE SYSTEM AND METHOD

CROSS-REFERENCE TO RELATED APPLICATIONS

This application is a divisional of application Ser. No. 11/385,040, filed Mar. 20, 2006, which is a continuation of application Ser. No. 11/204,751, filed Aug. 16, 2005, which is a continuation-in-part of application Ser. No. 11/057,055, filed Feb. 11, 2005, which in turn claims the benefit under 35 USC section 119(e) of U.S. Provisional Application No. 60/543,842, filed Feb. 11, 2004, and U.S. Provisional Application No. 60/605,390, filed Aug. 28, 2004; further, the application Ser. No. 11/204,751, filed Aug. 16, 2005, also directly claims the benefit under 35 USC section 119(e) of U.S. Provisional Application 60/605,390, filed Aug. 28, 2004. The entire specification, including all drawing figures, written description and any appendices of U.S. application Ser. No. 11/385,040, filed Mar. 20, 2006; U.S. application Ser. No. 11/204,751, filed Aug. 16, 2005; U.S. application Ser. No. 11/057,055, filed Feb. 11, 2005; U.S. Provisional Application No. 60/543,842, filed Feb. 11, 2004; and U.S. Provisional Application No. 60/605,390, filed Aug. 28, 2004 are hereby incorporated herein by this reference in their entireties.

INCORPORATION BY REFERENCE

The following documents are hereby incorporated herein by reference in their entirety, including appendices and material incorporated in the respective documents by reference:

(1) Intermec Technologies Corporation U.S. Pat. No. 6,330,975 issued Dec. 18, 2001, hereafter referred to as Danielson et al. U.S. Pat. 6,330,975. (Intermec Technologies Corporation is here used as designating Intermec Technology Corporation, Norand Corporation which has been merged into Intermec Technologies Corporation, and Intermec IP Corp. which is a wholly-owned subsidiary of Intermec Technologies Corporation.)

(2) Intermec Technologies Corporation PCT Published International Application, International Publication Number WO 90/16033 (hereafter referred to as Danielson et al. PCT International Publication Number WO 90/16033).

(3) Appendix A to the present specification relating to the Intermec Technologies Corporation 700 Series Mobile Computer.

(3A) Intermec Technologies Corporation U.S. Nonprovisional patent application Ser. No. 10/307,221 filed Nov. 29, 2002, entitled "Information Gathering Apparatus and Method Having Multiple Wireless Communications Options".

(3B) Intermec Technologies Corporation U.S. Provisional Patent Application, No. 60/474,804 filed May 30, 2003, entitled "Versatile Window System for Information Gathering Systems".

(3C) Intermec Technologies Corporation U.S. Nonprovisional patent application Ser. No. 10/858,504 filed Jun. 1, 2004, the nonprovisional of provisional Application No. 60/474,804.

(4) Appendix B to the present specification relating to the Intermec Technologies Corporation CK30 Handheld Computer.

(5) Copending U.S. patent application Ser. No. 11/057,055, filed on Feb. 1, 2005, is hereby incorporated herein in its entirety, including any and all specification pages, drawing figures, claims and appendices, and including any material incorporated by reference into U.S. patent application Ser. No. 11/057,055.

DETAILED DESCRIPTION

Figure 1:
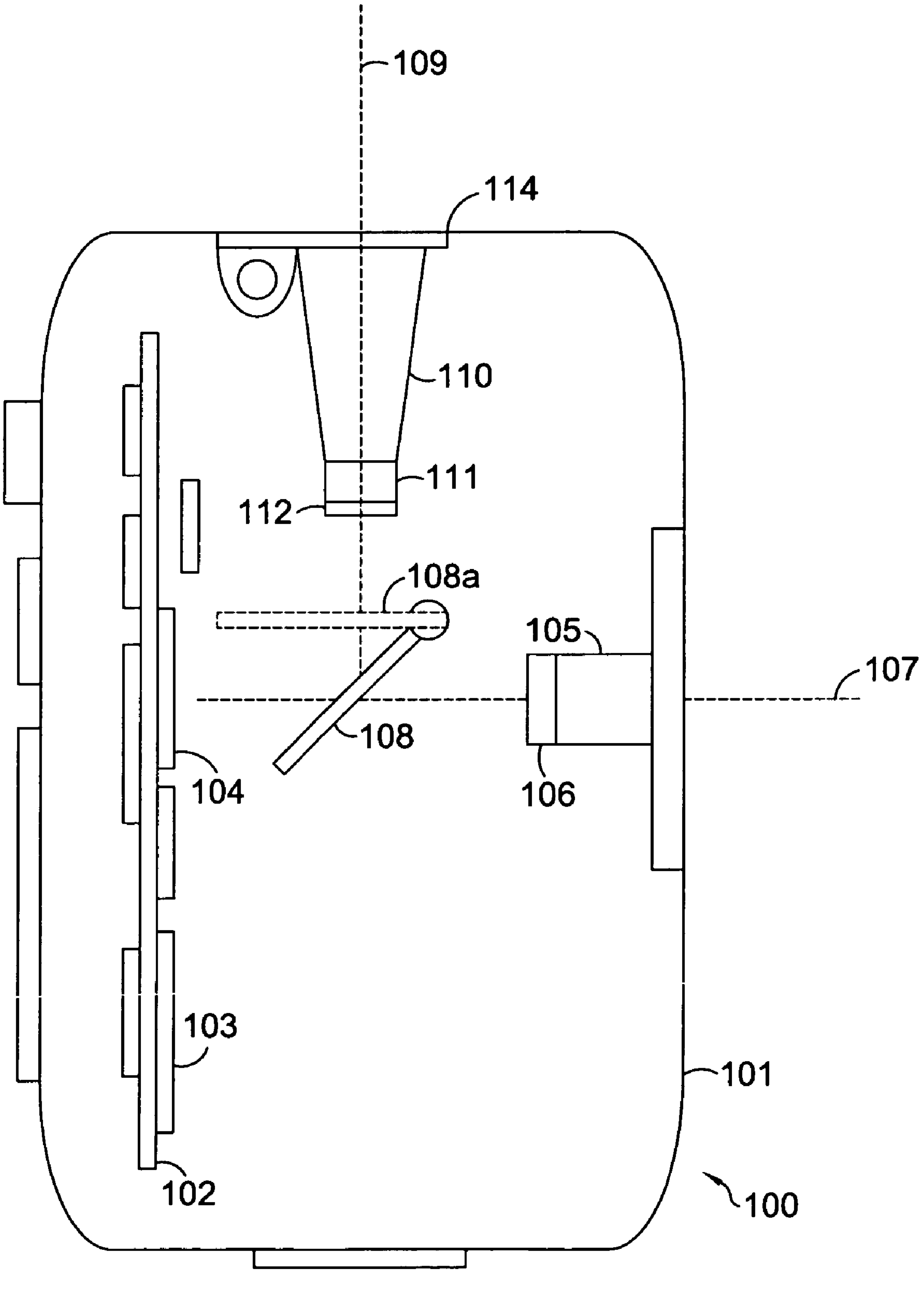
FIG. 1 depicts an image capture module.
Figure 2:
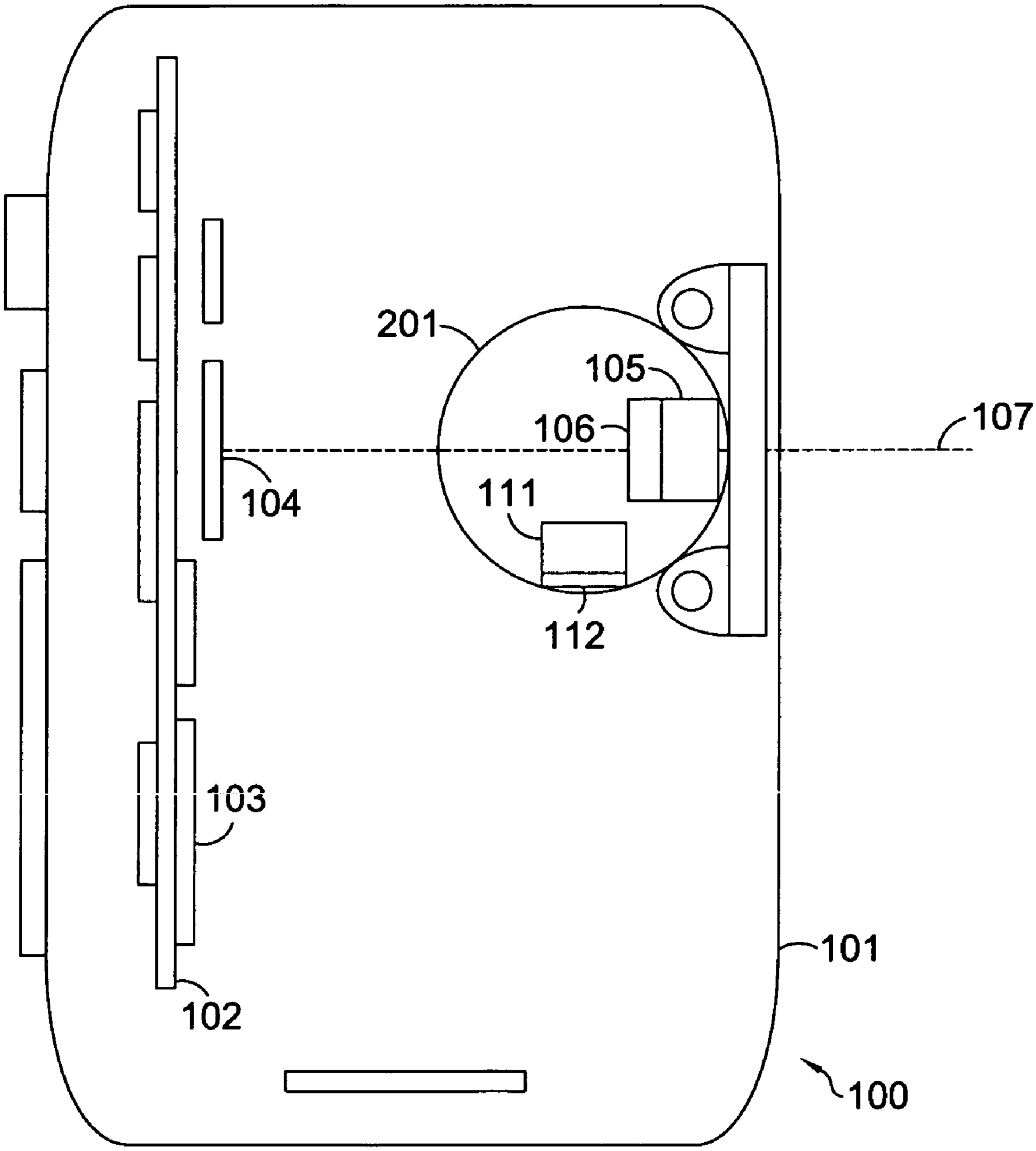
FIG. 2 depicts an embodiment of the invention wherein two or more lens systems are housed in a rotatable turret.
Figure 3:
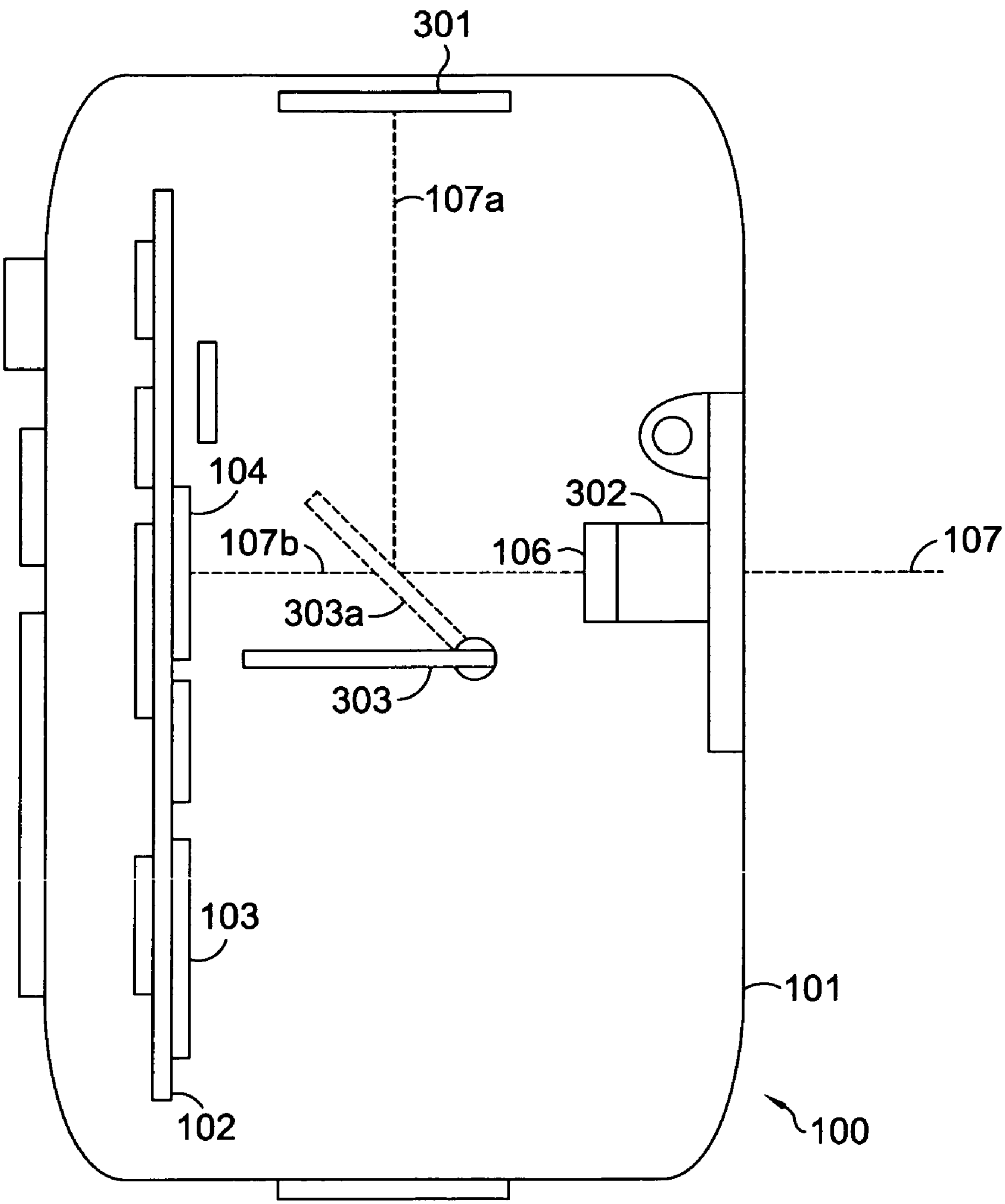
FIG. 3 depicts an embodiment of the invention in which there are two different 2D photo-detectors located in the image capture device.

Description of FIGS. 1, 2 and 3

FIG. 1 illustrates an image capture module (100) which can be utilized, for example, in any of the configurations disclosed in Danielson et al U.S. Pat. No. 6,330,975 of Intermec Technologies Corporation.

The embodiment of FIG. 1 includes a dual imaging system, but other embodiments may contain more than two imaging modes. Contained within the casing (101) is a printed circuit board (102) upon which 2D photo-detector (104) is mounted. In the embodiment shown the photo-detector is envisioned as one that is capable of being switched by the user between a color sensing mode for sensing color images incoming via path (107), and a monochrome mode for sensing black and white images, e.g. coded images and other indicia received via path (109), and also for switching between high resolution for sensing e.g. biometric images, and a lower resolution suitable for e.g. indicia images such as code symbologies and signatures. A module controller (103) is electrically coupled to the photo-detector (104) and to the components including shutters 106 and 112 of the optical paths to control their operation. Lens system (105) would be optimized for capture of photo or video images and lens system (111) would be optimized for capture of indicia, such as 2D codes and signatures. Instead of being a fixed element at the position (108) with a reflective mirror surface that reflects light received along path (109) but that is transparent to light on path (107), as in the Danielson et al U.S. Pat. No. 6,330,975, a mirror element (108) is utilized which is pivotally mounted so that it can pivot to position (108*a*), to allow more light to reach the photo-detector (104) when path (107) is to be operative.

FIG. 2 represents an embodiment of the invention wherein the two or more lens systems (105 and 111) are housed in a turret (201) which rotates in opposite directions to selectively place the optimal lens system in the light path (107) for focusing the desired image onto the 2D photo-detector (104) which may be operated as described with reference to FIG. 1.

FIG. 3 represents an embodiment of the invention in which there are two different 2D photo-detectors located in the image capture device. One photo-detector (104) would be used for video or photo capture and the other photo-detector (301) would be used to capture images of indicia. The mirror (303) would allow the light from lens assembly 302 and shutter 106 to pass onto photo-detector (104) via path 107*b* when the mirror is parallel to incoming light path (107), i.e. in its solid line position, and when placed in the dash line position (303*a*) at an angle to the incoming light path (107) would reflect the light onto path (107*a*) and photo-detector (301) which may be a black and white 2D photo-detector with higher light sensitivity (because it avoids a color filter at the 2D image sensor array), for the capture of indicia with lower illumination levels.

Figure 4:
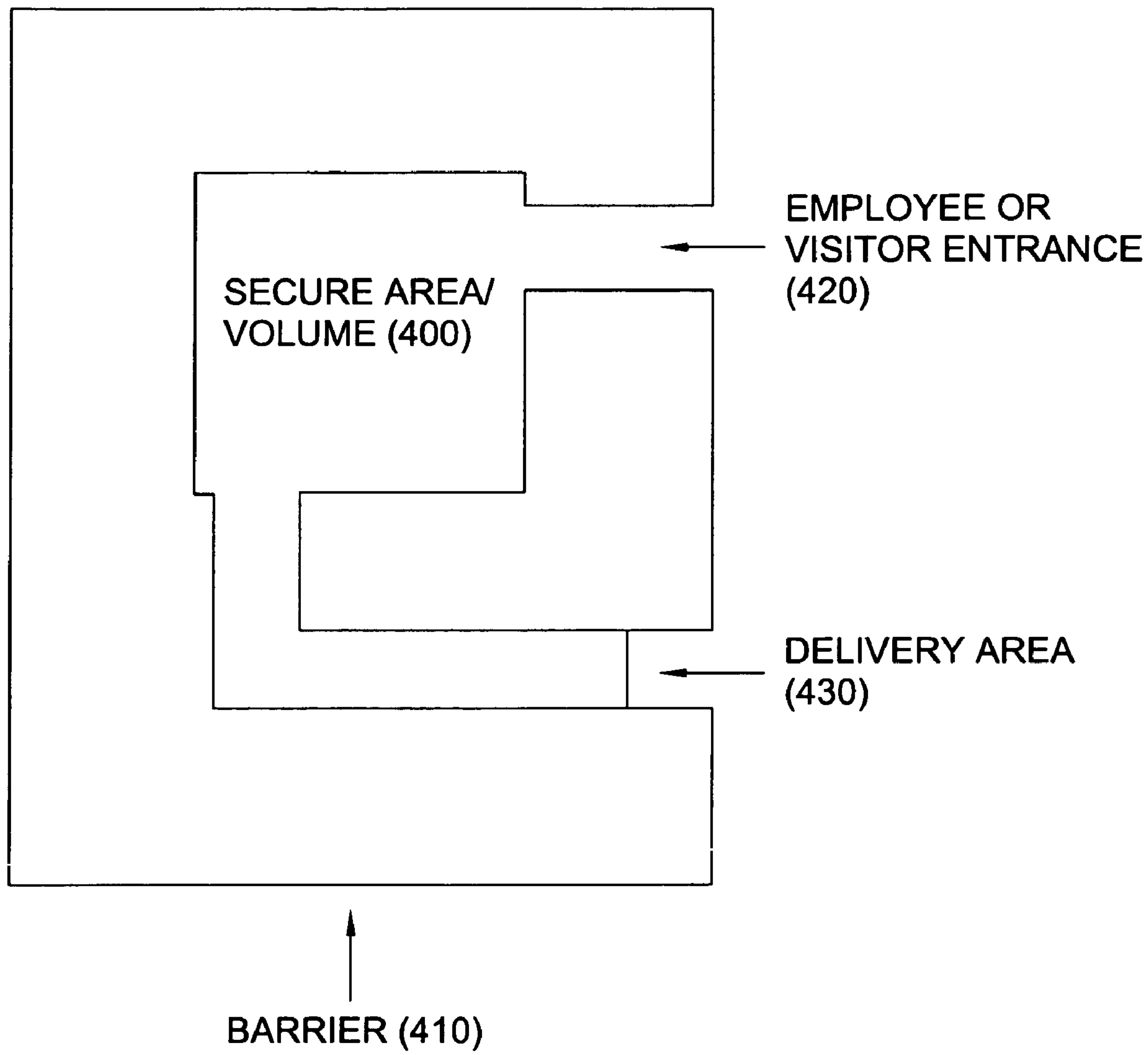
FIG. 4 depicts an application of the invention including a secure area or volume, such as an office building, that has a barrier.

Description of FIG. 4

FIG. 4 illustrates an application of the invention wherein a secure area or volume, such as an office building, 400 has a barrier 410 such that approach to the building is restricted to an employee or visitor entrance 420 which might provide for delivery by a delivery person on foot at a ground level, and a delivery area 430 consisting of a receiving dock, for example accessed via a driveway to a lower level with vehicle identification, driver identification and the like.

The following is an exemplary sequence of events that might occur in delivering a package to building (400).

(1) A package is scheduled for delivery and digital information about the package is sent to the receiving organization at office building (400) from an authenticated source.

(2) Personnel (or an intelligent system) at the receiving organization can verify that the package has been ordered with the use of a system that has access to the advance digital information about the delivery. (An inquiry could also be sent to the person who ordered or is to receive the package to verify that the delivery is authorized.)

(3) When the delivery person arrives at the visitor entrance (420), a photographic image of the person may be captured for facial recognition. This image is certified time stamped and then compared with an onsite database of the images of regular delivery personnel. If there is no match at the onsite database, the image could be sent to the dispatch center for the delivery service to verify the identity of delivery person.

(4) When the package arrives at the office building (400) at a delivery area (420) or (430) it can be identified by its unique bar code or RFID tag. Personnel or an intelligent system can immediately check to see if the package is expected, that the package matches the form factor, weight, size and origination, etc expected.

(5) If the package and delivery personnel meet all expectations then delivery of the package is accepted. If not, then other security protocols may come into play.

Because the information capture systems herein disclosed can provide various means for gathering information, (including image capture, video capture, radio frequency identification—RFID, indicia recognition, and biometrics including voice recognition) in a portable package, such portable information capture systems will facilitate setting up security checkpoints such as the visitor entrance (420) or the delivery area (430), or at a remote location in a timely fashion. A portable device such as the Intermec 700 Series hand held computer of Appendix A can provide for identification of personnel and material, and verification over a secure RF channel or other wireless network.

Figure 5:
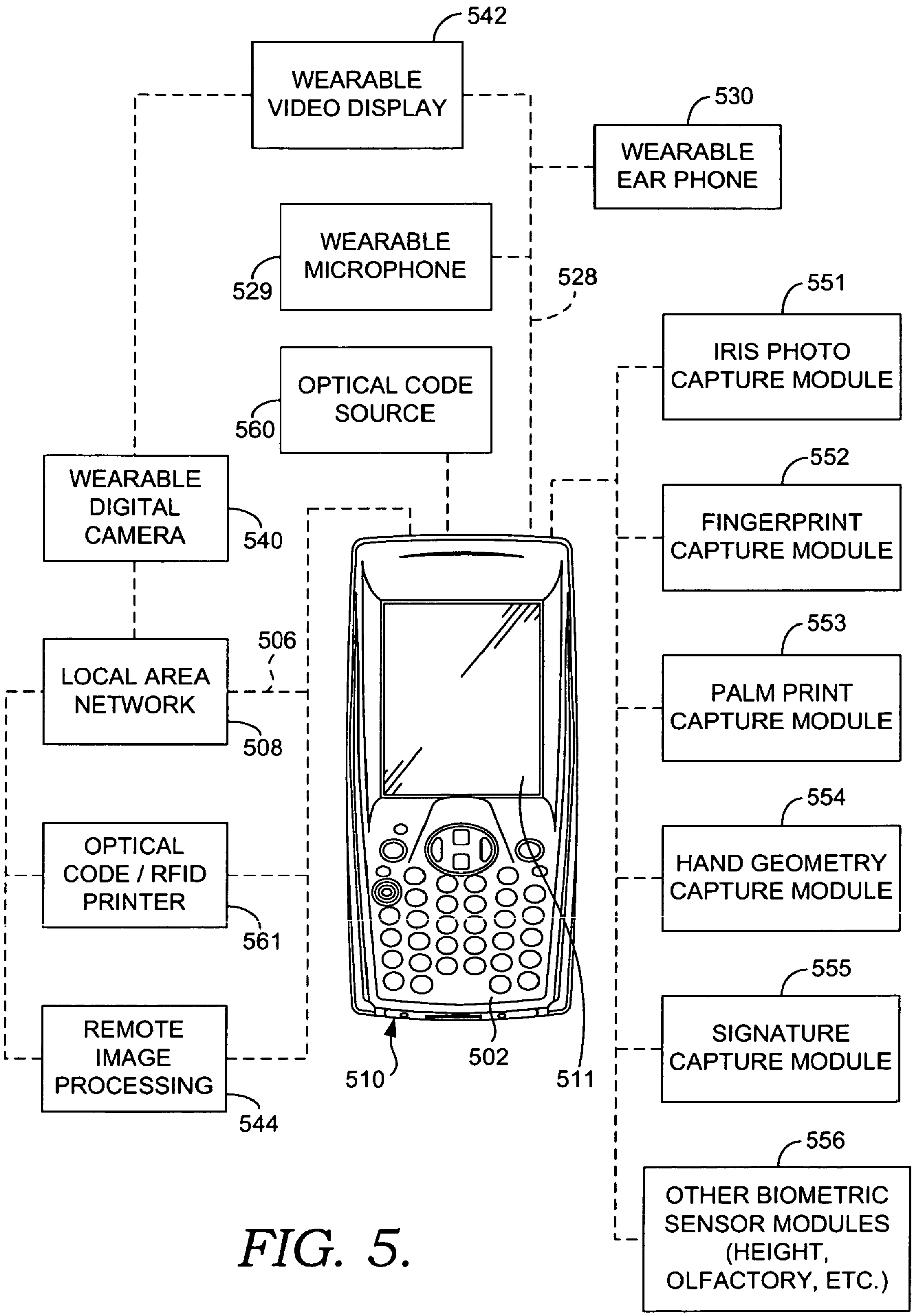
FIG. 5 illustrates a hand held computer terminal.

Description of FIG. 5

FIG. 5 illustrates a hand held computer terminal 510 such as the model 700 series color mobile computer of Intermec Technologies Corporation. Information on the model 700 is found in Appendix A which is hereby incorporated herein by reference in its entirety.

As described in detail in a pending patent application, application Ser. No. 10/307,221 filed Nov. 29, 2002, which is hereby incorporated herein by reference in its entirety, including material incorporated in application Ser. No. 10/307,221 by reference, e.g. with reference to the second figure of application Ser. No. 10/307,221, computer terminal 510, FIG. 5, may comprises a color screen 511 with touch and stylus input, and a data entry keypad 502.

A Compact Flash slot is capable of receiving Type II CF cards. The Compact Flash (CF) slot can be used, for example, to couple a Compact Flash Card or a CF 802.11b radio frequency transceiver to the device. The Compact Flash slot is buffered from the CPU to allow the card slot to be powered off and allow unit operation. The user can remove an access door via two screws to gain access to the Compact Flash slot. Dash line 506 in FIG. 1 may represent a radio link between a CF 802.11b radio frequency transceiver of terminal 510 and a local area network 508.

The embodiment of FIG. 5 may include a processor and e.g. four wireless communication systems. One of the radio frequency transceivers is a wireless WAN transceiver e.g. coupled via a whip antenna with a wide area network via a RF link. Specifically, the wireless WAN transceiver of this embodiment can be either a GPRS or a CDMA transceiver. The GPRS functionality can be provided using an Intel (Xircom) GEM or Siemens OEM radio module. The GPRS radio supports normal Global System for Global Communications (GSM) voice and data functionality as well. The voice interface is integrated into the audio system of this information handling device. A headset interface with a coupling 528 to microphone 529 and earphone 530 can support the GSM voice calls. The radio provides an input and output audio gain control, which can be controlled via software.

The GPRS antenna of the embodiment of FIG. 5 can be an external whip antenna using a standard SubMiniature version A (SMA) connector. Two antennas can be included, a dual band 900/1800 MHz for most countries, and a 1900 MHz for PCS band operation (North America). The external whip antenna can be approximately three inches in length.

A hardware control is provided so that software can control whether or not the GPRS radio is powered during suspend mode. If the GPRS transceiver remains powered during a suspend state of the information handling device, activity on the RI pin from the GPRS radio will resume the computer. Thus, in this mode of operation, the device can be essentially in a sleep mode, but the radio transceiver can still watch for incoming communications.

A customer accessible Subscriber Identity Module (SIM) card socket can also be provided in conjunction with the embodiment of FIG. 5. The SIM socket can be accessed through a door in the front of the information handling device. A switch can be added to power down or suspend the unit when a SIM card is removed.

The CDMA voice interface can be integrated into the audio system. The interface 528 can support the CDMA voice calls. Further, the CDMA transceiver can provide an input and output audio gain control that can be controlled via software.

General Discussion

In embodiments such as shown in FIGS. 1, 2 and 3, an image capture module 100 may be essentially self contained with its own power supply as described with reference to the eighth figure of the incorporated Danielson et al U.S. Pat. No. 6,330,975. Such self-contained image capture modules may be detachably assembled with a handheld terminal as illustrated in the first, second, third, seventh (i.e. 7*a*, 7*b* and 7*c*), eighth, ninth and fourteenth (parts a and b) figures of the incorporated Danielson et al. U.S. Pat. No. 6,330,975. In other embodiments, the image capture modules 100 of FIGS. 1, 2 and 3 may be integrated into a common housing with the terminal components as illustrated in the twelfth (part a) and thirteenth part a) figures of the incorporated Danielson et al U.S. Pat. No. 6,330,975. In still other embodiments, the image capture module 100 of FIGS. 1, 2 and 3 may be incorporated in a handle assembly for a terminal to form a "scan handle" for the terminal. A scan handle arrangement is shown in the eleventh through nineteenth figures of Danielson et al PCT International Publication Number WO 90/16033 published 27 Dec. 1990, which is hereby incorporated herein by reference in its entirety. In still further embodiments, the image capture modules of FIGS. 1, 2 and 3 may be user supported in a hands free manner. In such hands free embodiments, as well as in the other embodiments mentioned, control of the image capture module may be via voice commands exclusively, or voice commands along with user operated controls such as shown in Intermec Technologies Corporation U.S. Pat. No. 6,036,093 which is hereby incorporated herein by reference in its entirety as showing various user support arrangements for the image capture modules of FIGS. 1, 2 and 3, and various user operated components and controls that may be associated with the user supported image capture modules.

Wearable digital camera component 540, FIG. 5, may represent any of the user supported hands-free type image capture modules described herein. The wearable digital camera 540 may be a still camera or a video camera, and in either event may provide image signals and data capture information to wearable video display 542, and may provide data capture information in the form of synthesized speech to ear phone 530. Optionally, digital camera 540 may supply image signals and image capture information to a remote image processing installation 544, which may supply processed images and data capture information to display 542 and earphone 530, and/or terminal 510.

While FIGS. 1, 2 and 3 have indicated the use of moving parts 108, 201 and 303, to select optical paths or lens characteristics, the present disclosure also contemplates the use of optical components which accomplish the same result without moving parts. See, for example, Intermec Technology Corporation Massieu U.S. Provisional Application No. 60/538,868 filed Jan. 23, 2004 entitled "Autofocus Barcode Scanner and the Like Employing Micro-Fluidic Lens", Intermec Docket 203502, which is hereby incorporated herein by reference in its entirety.

While FIG. 1 shows the optical paths 107 and 109 entering the module from different sides, the optical paths 107 and 109 may enter the module through a common window as generally shown in Danielson et al. U.S. Pat. No. 5,308,966, e.g. the thirteenth and fourteenth figures. This Danielson et al. U.S. Pat. No. 5,308,966 is hereby incorporated herein by reference in its entirety, and is hereby disclosed as applying to any of the 2D image array photosensors described herein or disclosed in documents incorporated herein by reference. Applying the sixteenth column and the thirteenth figure of this Danielson et al. Patent to FIG. 1 hereof, for the purpose of e.g. enlarging the depth of focus for 2D images, and for e.g. increasing the speed of adaptation of the reader to a given 2D code configuration, the reader housing 101 may accommodate a plurality of adjustable lens means such as 105 and 111 associated with a common window, e.g. with respective overlapping depths of field so that for fixed focus positions of the lens means, the depth of field may be greatly enlarged. Such multiple lens means 105 and 111 could be of the auto focus type e.g. as disclosed in the Danielson et al. U.S. Pat. No. 5,308,966, and adjusted simultaneously so that the lens systems in each respective focus position thereof may have the total depth of field greatly enlarged, e.g. during rapid movement of the module 100 toward a target indicia. Distance measurement means as taught in Danielson et al. U.S. Pat. No. 5,308,966 may be coupled with the control and processor means in order to provide range information to such control and processor means so that the proper focal path 107 or 109 may be selected, or both may be selected together or in quick succession, e.g. to cover an expected further range of movement toward a target 2D code. See, for example, column nine and the second figure of the Danielson et al. U.S. Pat. No. 5,308,966 concerning reading of different segments of a curved bar code at different ranges from the code imager. For 2D codes, the use of plural optical paths such as 107 and 109 selected to have different overlapping focus ranges, can be useful not only for 2D codes on a curved surface, but also for reading 2D codes on a plane surface that is substantially skewed from a position generally normal to the reader optical axes.

Two or more paths such as 107 and 109 with a common window may be activated simultaneously, with each reading e.g. the same entire 2D code configuration, or e.g. two separate 2D code configurations within the field of view of the respective optical paths such as 107 and 109. Two image readings of the same 2D code may be processed in succession or simultaneously for greater accuracy, (e.g. by forming a composite 2D image), and/or to assure a successful reading as quickly as possible, for example as described in Intermec Technologies Corporation U.S. Nonprovisional application Ser. No. 08/879,467 filed Jun. 20, 1997, which is hereby incorporated herein by reference in its entirety, as disclosing features that may be applied to any of the embodiments described herein.

With respect to FIG. 3 hereof, the teachings of the seventeenth column and fourteenth figure of the Danielson et al. U.S. Pat. No. 5,308,966 may be applied, so that the image paths such as 107*a* and 107*b* when emanating from a common window at different angles, together could provide the result that the depth of field for each respective image path would overlap with the depth of field of other of the image paths, so that the single lens means such as 302 but arranged in a common path position as in the incorporated fourteenth figure, would cover images anywhere within a range in front of a common window corresponding to a multiple of the depth of field provided by the lens means 302 in a given focus position and a single light path such as 107, FIG. 3. Thus, through proper multiple mirror placement and folding of the optical image paths, a common lens assembly could focus on multiple depths in front of the reader, the processor component selecting the respective 2D image sensor or 2D image sensors such as 104 and 301, FIG. 3, from which to assemble the pixels of a complete 2D bar code reading, and e.g. controlling shutters to block undesired light paths, e.g. blocking light path 107*a*, or 107*b*, where a common 2D image array photosensor is used by analogy with the fourteenth figure of Danielson et al. U.S. Pat. No. 5,308,966.

Figure 6:
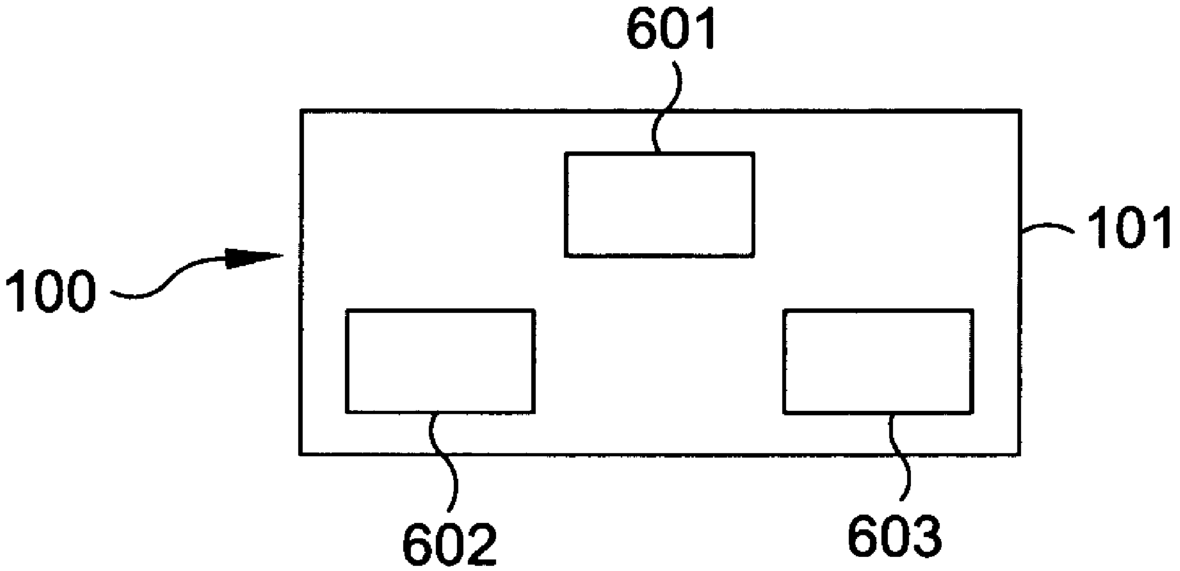
FIG. 6 depicts portals in an image capture module.

Description of FIG. 6

As explained in Intermec Technologies Corporation U.S. Nonprovisional Application No. 60/474,804 filed May 30, 2003, "Versatile Window System for Information Gathering Systems, Express Mail Label No. ET 476 840 709US, where it is desired to use different types of optical indicia readers, different types of window constructions may be desirable. Thus, for embodiments which are modifications of FIGS. 1 and 3 and which are to provide plural light paths entering the casing 101 at a common side, and where different readers such as a laser scanner and a digital imager are to be associated with the respective light paths, different window constructions may be accommodated in a given side of casing 101, e.g. as shown in FIG. 6.

In FIG. 6, reference numerals 601, 602 and 603, may represent portals in an image capture module 100 such as portal one hundred four of the incorporated Provisional Patent Application 60/474,804 filed May 30, 2003, incorporated Reference (3B). Each portal may selectively receive a window suited to a 1D or 2D laser scanner, a code imager, or a color photo non-video (less than thirty frames in one second) or video camera. For example, portal 601 in FIG. 6 may receive a 2D laser scanner window, portal 602 may receive a monochromatic code imager window, and portal 603 may receive a color digital photo camera window. The 2D laser scanner at portal 601 may be used to mark the field of view of the code imager at portal 602 e.g. as taught generally in Intermec Technologies Corporation U.S. Pat. No. 5,949,056 (e.g. in the thirteenth figure and column eleven). The 2D laser scanner may generate brackets for marking a 2D code target, or a field of view of a 2D imager, generally as indicated in the forty-eighth through fiftieth and fifty-third and fifty-fourth figures of Intermec Technologies U.S. Pat. No. 5,841,121, A color digital camera at portal 603 may observe a central laser beam spot from portal 601 on a target, and map such spot on a calculated field of view of the imager at portal 602, and thus serve to control the 2D laser beam to frame the field of view of the imager of portal 602. As generally disclosed in Intermec Technologies Corporation Published International Application Number WO 93/18478, which is hereby incorporated herein by reference in its entirety, e.g. at page 7, pattern recognition techniques can be used to locate decodable 2D symbols, e.g. a 2D symbol closest to the central laser aiming spot from portal 601, FIG. 6, and highlight such 2D code on a display for the user. In the present disclosure, the control system associated with the color digital camera of portal 603 may, instead of highlighting the displayed 2D code, or in addition to highlighting the selected 2D code on the display, control the 2D laser scanner at portal 601 to frame, e.g. with a rectangular array of laser spots, the selected 2D code on the target surface (where it can be more conveniently viewed by a user without changing the user's focus which is normally directed toward the target 2D indicia). The general approach of using a laser scanner for bar code reading and also for communicating indicia such as graphics to a user (e.g. a head up display), is disclosed in Intermec Technologies Corporation U.S. Pat. No. 5,878,395 which is hereby incorporated herein by reference in its entirety. The module 100 of FIG. 6 may be self-contained with its own battery power, or may be incorporated with a terminal having a display for guiding the user in aiming and the like, or may be incorporated in a handle which supports the terminal with the display for presenting aiming information and the like. Further, portal 601 may be part of the terminal 510, FIG. 5, for reading optical code indicia such as indicated at 560, FIG. 5, while portals 602 and 603 may be part of a separate module attached to a handle for the terminal 510, and having high speed communication with the terminal. Terminal 510 can control an optical code/RFID label printer such as indicated at 561, FIG. 5.

FIG. 6 should be taken as illustrating a camera at 603 and the laser scanner at 601 in one unit without, for example, a third reading assembly at 602. Two scanners, for example, at 602 and 603 could be adapted to cover different ranges and there could be just two windows in the module 101 of FIG. 6. The scanners or cameras could be part of a pistol shaped device without additional components, for reduced power consumption and the reader device could have, for example, a 2D code reading camera at 603 and a laser scanner at 602, or two laser scanners adapted to different ranges at portals 602 and 603, again without use of the portal 601. As previously explained, such two portal configurations could be integrated into a hand held terminal or be user supported e.g. on a user's wrist or be part of a pen based slate type terminal or be part of a fixed terminal. The camera could be used for security purposes and the scanner could be used for reading optical indicia and signatures, or for other purposes. If a two-portal unit had a laser scanner and a black and white code imager, or a laser scanner and a 2D reading color camera, or a code imager and a color digital camera, or two of the same type of imaging devices, different scanning orientations might be used as indicated in FIGS. 1, 2, 3 and 6. A coded image reader might be used for monochromatic reading of 2D indicia, and the color image capture camera could be used for biometric verification. Radio frequency identification (RFID) type technology could also be used with any of the plural or multiple image capture units disclosed herein. As indicated in FIG. 5, a terminal 502 or a wearable camera 540 or other modules such as indicated at 551-556 could be used for biometric identification. Other biometric sensors such as for retinal imaging, facial recognition, voice recognition and those based on other techniques may be utilized with any of the embodiments herein, as represented at 556, in FIG. 5. The terminal 510, for example, could transmit voice input at microphone 529 over the internet, using a voice over internet protocol format for voice recognition, and other information such as facial or other identification images could be transmitted digitally along with the voice message.

Using selective imaging systems can benefit power consumption, the device selected could be utilized while other devices were omitted, e.g. from casing 101, FIGS. 1, 2, 3, and 6, or from terminal 510, FIG. 5. The unit could disable power to any inactive devices when present. One imaging device such as indicated by portal 602, FIG. 6, could scan only black and white images while another device such as indicated at portal 603, FIG. 6, would scan color and/or black or white, and could utilize a higher resolution sensor array. The color imaging device would be useful for security applications such as, for example, event ticket verification (to prevent fraud).

Additional benefits from the disclosed plural or multiple imaging devices could be their interaction such as herein described. In other words, the laser imager, for example, at portal 601, FIG. 6, could be used for aiming the 2D imager, for example, at portal 602. The laser scanner could also read bar codes and 2D images, while the camera at 540 (e.g. head mounted) captures another image, such as a signature line. Also, the imager could have a viewfinder function provided by the terminal display. The laser scanner could be used as a projection display output device as previously described, as well as an input device for reading coded indicia. The present teachings apply to use of two or more image reading devices such as laser scanners, black and white imagers, color digital cameras, video cameras, etc., and the combination of such devices in the same unit. For example, a hand held computer terminal may have an onboard laser scanner and may have a 2D code reading camera installed in a handle corresponding to a scan handle as previously described, or the camera may be wrist mounted or otherwise user supported, depending on the particular application. For example, a laser scanner might be used to scan indicia, and the color camera or video camera used for security purposes. In each case functions that were not required could be powered down or omitted.

For an embodiment comprising a 2D code reading digital camera and a laser scanner, for example, the laser scanner may operate from portal 601, FIG. 6, and the digital camera may be particularly suited for 2D code reading and operate from a portal centered between portals 602 and 603 in FIG. 6 and directly below portal 601, e.g. with portals 602 and 603 omitted. The digital camera may be monochromatic where this provides higher sensitivity than a color digital camera in black and white mode. The camera can be used for additional biometric purposes, for example, fingerprints, iris photo, palm prints, general photo, 1D and 2D bar code capture, and signature capture. A Bluetooth radio could provide for voice recognition and might be associated with a wearable microphone such as indicated at 529, FIG. 5.

Those utilizing this technology, either with the arrangement previously described for FIG. 6, or with the arrangement utilizing a laser scanner at 601 and a digital monochrome or color digital camera directly below portal 601, FIG. 6, would include: law enforcement, hospital/emergency workers, disaster response teams, Red Cross type agencies (for shelters, disaster response and other similar activity) and the travel industry (air, auto/truck rental, bus, cruise, train, etc.), and homeland security. At the airport, such data capture units could be used for passenger check-in, baggage check-in, boarding pass issuance (with a picture as an option), and the like.

The CK30 of Appendix B or a similar handheld terminal would be suitable as the terminal indicated at 510, FIG. 5. One device such as represented in FIG. 6, may utilize two cameras as indicated at 602 and 603, or several such devices as indicated in FIG. 5, may be associated with a single user. In such cases, one camera might be a black and white camera with a 2D monochrome sensor array and the other a color digital camera, or where the sensitivity of the color camera to code images is sufficient, two color digital cameras could be utilized at 602 and 603 and used for stereoscopic image taking, as well as dual picture taking for composite image processing or for assurance of at least one good read (based on two simultaneously obtained images), for faster code reading throughput as previously mentioned.

In another embodiment of the invention the selection between the imaging devices e.g. at 601, 602, and 603 could be automatic based upon the type of image that is sensed e.g. by the color digital camera at portal 603; in this embodiment there could be an intelligent supervisory system programmed into the controller which views the scene toward which the module is aimed, e.g. toward coded images and other indicia, and controls the module according to the type of image which is in the field of view of the 2D color sensor array of the camera at portal 603, or which alerts the user to the types of information available within the field of view and allows the user to select which image is to be acquired e.g. via a display of the field of view on a display screen, (e.g. as described in Durbin U.S. Pat. No. 5,821,523 of Intermec Technologies Corporation). The supervisory system can be equipped to sense motion of the imaging module as well as the range to a target, so as to time activation of the various components for minimum power consumption. For example when a read is indicated as desired, the laser scanner can provide a central aiming marker beam which is directed by the supervisory system according to the target e.g. centered on the laser scanner field of view, or centered on the field of view of the code imager at portal 602, and control the laser scanner to frame the 2D indicia closest to the centered marker beam on the target as previously described. The selected indicia can be read from the imager sensor array associated with portal 602 as a separated signal for decoding to simplify and speed up the decoding process.

With regard to the digital camera and other imaging devices discussed above, a user supported digital camera system may comprise a general purpose digital camera for capturing images of a subject and other scenes for security or identification purposes. A user supported digital camera system may also comprise a digital camera for capturing information concerning a container such as a briefcase or package accompanying a subject. For example the digital camera may read optical indicia associated with a package such as optical code symbology or human readable information such as an identification number. Such a digital camera can also read signatures for confirming identity and the like. A photo record of a subject together with a carry-on piece of luggage or the like, would assist in identifying the subject who leaves such an item on a commuter train or other location that might represent a security risk, and would tend to indicate the relative size of the carry-on piece of luggage or the like since the photo record includes the luggage or the like as well as e.g. a full height view of the person carrying the luggage. By way of example, a commuter ticket to be displayed on a commuter train, might indicate that one piece of luggage was associated with the passenger. The conductor checking tickets could have a wearable reader such as an RFID reader for reading a ticket number which could be associated with a photo of the passenger and the luggage. The luggage could be required to have an RFID tag showing the destination and passenger identification, e.g. a stored digital version of the photo of the passenger and the luggage, to further identify the luggage. A passenger leaving e.g. a commuter train could then be required to have his ticket and any associated luggage with him at the point of disembarkation.

For the case of a container such as a package or envelope being delivered to a secure area such as depicted in the fourth figure of the incorporated Application No. 60/605,390, the intended recipient could transmit an access code to the source of an authorized package, and such code then be incorporated with the shipping label, so as to establish that the package was authorized. Security personnel at the secure area could have user carried digital cameras for reading the access code on incoming packages, and e.g. use any of the various biometric readers disclosed herein to identify the person delivering a package. For the case of a new delivery person, a photo image, voice print, and/or other biometric data could be collected, and the identity of the delivery person could be approved e.g. by the relevant delivery company or the like.

The delivery process as described with reference to the fourth figure of the incorporated Provisional Application 60/605,390, is hereby disclosed as including the teachings of Stephen J. Kelly Published Application US 2002/0046173 published Apr. 18, 2002; for example a locked access to a delivery conveyor could be controlled by a computer system and a closed circuit television system and remote security guard, or could be completely controlled by a computer system; in either case the computer system would receive the information required by the teachings of the Published Application US 2002/0046173 and the outputs of any of the biometric sensors 840 and 851-856 for further identifying the delivery person. The conveyor could lead to a cargo space of a vehicle as an alternate to leading to the interior of a secure area such as a building.

What is claimed is:

1. A mobile system, comprising:

an iris photo collecting system for generating a digitized image of a iris collected from a subject wherein the iris photo collecting system includes a photo-detector that has at least two modes, a color sensing mode and a monochrome mode, and a mirror element that is pivotally mounted to change in position based on the mode of the photo-detector;

a database system configured to store a database containing a plurality of iris templates cross-referenced with identification information, said database system configured to compare the digitized iris images generated by the iris photo collecting system with the iris templates stored in the database to provide identification information for the iris; and a communication system providing real time communication of the digitized iris image and identification information between said iris photo collecting system and said database system;

wherein the iris photo collecting system further comprises a digital camera system, the digital camera system reads container information of a container associated with the subject, the communication system transmitting the container information to the database system, the database system stores container data concerning an approved container for comparison with the container information read by the digital camera system, and the container comprises at least one of a package, a luggage, an envelope, and a briefcase.

2. A mobile system, comprising:

an palm print collecting system for generating a digitized image of a palm print collected from a subject wherein the palm print collecting system includes a photo-detector that has at least two modes, a color sensing mode and a monochrome mode, and a mirror element that is pivotally mounted to change in position based on the mode of the photo-detector;

a database system configured to store a database containing a plurality of palm print templates cross-referenced with identification information, said database system configured to compare the digitized palm print images generated by the palm print collecting system with the palm print templates stored in the database to provide identification information for the palm print; and a communication system providing real time communication of the digitized palm print image and identification information between said palm print collecting system and said database system;

wherein the palm print collecting system further comprises a digital camera system, the digital camera system reads container information of a container associated with the subject, the communication system transmitting the container information to the database system, the database system stores container data concerning an approved container for comparison with the container information read by the digital camera system, and the container comprises at least one of a package, a luggage, an envelope, and a briefcase.

3. A mobile system, comprising:

an hand geometry collecting system for generating a digitized image of a hand geometry collected from a subject wherein the hand geometry collecting system includes a photo-detector that has at least two modes, a color sensing mode and a monochrome mode, and a mirror element that is pivotally mounted to change in position based on the mode of the photo-detector;

a database system configured to store a database containing a plurality of hand geometry templates cross-referenced with identification information, said database system configured to compare the digitized hand geometry images generated by the hand geometry collecting system with the hand geometry templates stored in the database to provide identification information for the hand geometry; and a communication system providing real time communication of the digitized hand geometry image and identification information between said hand geometry collecting system and said database system;

wherein the hand geometry collecting system further comprises a digital camera system, the digital camera system reads container information of a container associated with the subject, the communication system transmitting the container information to the database system, the database system stores container data concerning an approved container for comparison with the container information read by the digital camera system, and the container comprises at least one of a package, a luggage, an envelope, and a briefcase.

4. In a portable system, a user-supported data collection system comprising:

a iris sensor, a palm print sensor, or a hand geometry sensor that collects respectively an iris photo, a palm print, or a hand geometry and generates respectively a digitized image of the iris photo, the palm print, or the hand geometry;

a photo-detector that provides at least two modes, a color sensing mode and a monochrome mode;

a mirror element that is pivotally mounted to change in position based on the mode of the photo-detector;

a display configured to display identification information for the the iris photo, the palm print, or the hand geometry; and a communication system that provides real time communication of the iris photo, the palm print, or the hand geometry, and identification information between the digital camera system and a database system; and a digital camera system that reads container information of a container associated with the subject, the digital camera system stores container data concerning an approved container for comparison with the container information read by the digital camera, and the container comprises at least one of a package, a luggage, an envelope, and a briefcase.

5. The portable system of claim 4, wherein the digital camera system generates additional information related to the subject.

6. The portable system of claim 5, wherein the digital camera system reads additional information, the communication system transmitting the additional information to the database system.

7. The portable system of claim 4, wherein the digital camera system reads additional information, and the communication system transmits the additional information to the database system.

8. A method for providing real time identification and verification of iris photos, palm prints, or hand geometries, comprising the steps of:

collecting and generating a digitized image of an iris photo, a palm print, or a hand geometry of a person using respectively an iris photo collecting system, a palm print collecting system, or a hand geometry collecting system, wherein the iris photo collecting system, the palm print collecting system, or the hand geometry collecting system includes a photo-detector that has at least two modes, a color sensing mode and a monochrome mode, and a mirror element that is pivotally mounted to change in position based on the mode of the photo-detector;

reading container information of a container associated with the person;

transmitting the digitized image of the iris photo, the palm print, or the hand geometry, and the container information to a database system via a wireless radio frequency link wherein the database system stores container data concerning an approved container for comparison with the container information, and the container comprises at least one of a package, a luggage, an envelope, and a briefcase;

comparing the digitized image of the iris photo, the palm print, or the hand geometry respectively with iris photo templates, palm print templates, or hand geometry templates stored in a database and cross-referenced with identification information; and if the digitized image of the iris photo, the palm print, or the hand geometry matches respectively to an iris photo template, a palm print template, or a hand geometry template, transmitting the cross-referenced identification information respectively to the iris photo device, the palm print device, or the hand geometry device via the wireless radio frequency link.

* * * * *